US008880569B2

(12) United States Patent
Draper et al.

(10) Patent No.: US 8,880,569 B2
(45) Date of Patent: Nov. 4, 2014

(54) GRAPHICAL USER INTERFACES FOR CUSTOM LISTS AND LABELS

(75) Inventors: Linette Draper, Escondido, CA (US); Thomas Kevin Ryan, Valley Center, CA (US); Brian J. Wasserman, Escondido, CA (US); Paul H. Phibbs, Escondido, CA (US)

(73) Assignee: Teradata US, Inc., Dayton, OH (US)

(*) Notice: Subject to any disclaimer, the term of this patent is extended or adjusted under 35 U.S.C. 154(b) by 1315 days.

(21) Appl. No.: 11/787,472

(22) Filed: Apr. 17, 2007

(65) Prior Publication Data

US 2007/0244922 A1 Oct. 18, 2007

Related U.S. Application Data

(63) Continuation-in-part of application No. 11/646,655, filed on Dec. 28, 2006.

(60) Provisional application No. 60/792,422, filed on Apr. 17, 2006.

(51) Int. Cl.
*G06F 17/30* (2006.01)

(52) U.S. Cl.
CPC ................................ *G06F 17/30389* (2013.01)
USPC .......................................................... 707/805

(58) Field of Classification Search
USPC .......................................... 715/762; 707/805
See application file for complete search history.

(56) References Cited

U.S. PATENT DOCUMENTS

| | | | | |
|---|---|---|---|---|
| 5,495,567 | A * | 2/1996 | Iizawa et al. | 715/762 |
| 5,519,859 | A | 5/1996 | Grace | |
| 5,664,173 | A | 9/1997 | Fast | |
| 5,806,057 | A | 9/1998 | Gormley et al. | |
| 5,884,298 | A * | 3/1999 | Smith et al. | 707/2 |
| 5,924,090 | A * | 7/1999 | Krellenstein | 707/5 |
| 5,926,797 | A | 7/1999 | John | |
| 6,341,282 | B1 | 1/2002 | Sharpe et al. | |
| 6,405,192 | B1 * | 6/2002 | Brown et al. | 707/3 |
| 6,571,251 | B1 | 5/2003 | Koski et al. | |
| 6,578,028 | B2 | 6/2003 | Egilsson et al. | |
| 6,748,374 | B1 | 6/2004 | Madan et al. | |
| 6,938,034 | B1 | 8/2005 | Reiner et al. | |
| 7,007,294 | B1 | 2/2006 | Kurapati | |
| 7,131,060 | B1 | 10/2006 | Ronald | |
| 7,231,612 | B1 | 6/2007 | Mani et al. | |
| 8,005,704 | B2 | 8/2011 | MacFarlane et al. | |
| 2002/0007362 | A1 | 1/2002 | Collins et al. | |
| 2002/0152190 | A1 | 10/2002 | Biebesheimer et al. | |
| 2002/0180791 | A1 | 12/2002 | Scott et al. | |

(Continued)

OTHER PUBLICATIONS

"U.S. Appl. No. 11/646,655, Final Office Action mailed Oct. 27, 2009", 21 pgs.

(Continued)

*Primary Examiner* — Robert Beausoliel, Jr.
*Assistant Examiner* — Nirav K Khakhar
(74) *Attorney, Agent, or Firm* — Schwegman, Lundberg & Woessner, P.A.

(57) ABSTRACT

Graphical User Interfaces for custom lists and labels are provided. A database includes fields that define views when processed by an application server on behalf of a user. At least one view permits the user to supply criteria for custom defining lists or sets of labels, which are also retrieved from the database by the application server.

20 Claims, 6 Drawing Sheets

(56) References Cited

U.S. PATENT DOCUMENTS

| | | | | |
|---|---|---|---|---|
| 2003/0182278 | A1* | 9/2003 | Valk | 707/3 |
| 2004/0098383 | A1 | 5/2004 | Tabellion et al. | |
| 2004/0215531 | A1 | 10/2004 | Edward et al. | |
| 2005/0010877 | A1* | 1/2005 | Udler | 715/826 |
| 2005/0091205 | A1 | 4/2005 | Sidlosky et al. | |
| 2005/0097129 | A1* | 5/2005 | Ikeda | 707/104.1 |
| 2005/0187794 | A1 | 8/2005 | Kimak | |
| 2005/0289106 | A1 | 12/2005 | Petri et al. | |
| 2006/0136396 | A1 | 6/2006 | Brobst | |
| 2006/0136419 | A1 | 6/2006 | Brydon et al. | |
| 2007/0185826 | A1 | 8/2007 | Brice et al. | |
| 2009/0070301 | A1* | 3/2009 | McLean et al. | 707/3 |

OTHER PUBLICATIONS

"U.S. Appl. No. 11/646,655, Non-Final Office Action mailed Mar. 24, 2009", 16 pgs.

"U.S. Appl. No. 11/646,655, Response filed Jun. 24, 2009 to Non Final Office Action mailed Mar. 24, 2009", 11 pgs.

"U.S. Appl. No. 11/646,655, Response file Jan. 28, 2010 to Final Office Action mailed Oct. 27, 2009", 9 pgs.

"U.S. Appl. No. 11/646,655, Non-Final Office Action mailed Jun. 22, 2010", 18 pgs.

"U.S. Appl. No. 11/646,655, Advisory Action mailed Mar. 4, 2011", 2 pgs.

"U.S. Appl. No. 11/646,655, Final Office Action mailed Nov. 30, 2010", 17 pgs.

"U.S. Appl. No. 11/646,655, Response filed Feb. 28, 2011 to Final Office Action mailed Nov. 30, 2010", 9 pgs.

"U.S. Appl. No. 11/646,655, Response filed Sep. 22, 2010 to Non Final Office Action mailed Jun. 22, 2010", 9 pgs.

"U.S. Appl. No. 11/646,655, Final Office Action mailed Nov. 14, 2011", 17 pgs.

"U.S. Appl. No. 11/646,655, Non Final Office Action mailed May 24, 2011", 16 pgs.

"U.S. Appl. No. 11/646,655, Response filed Feb. 14, 2012 to Final Office Action mailed Nov. 14, 2011", 10 pgs.

"U.S. Appl. No. 11/646,655, Response filed Aug. 24, 2011 to Non Final Office Action mailed May 24, 2011", 8 pgs.

* cited by examiner

FIG. 3

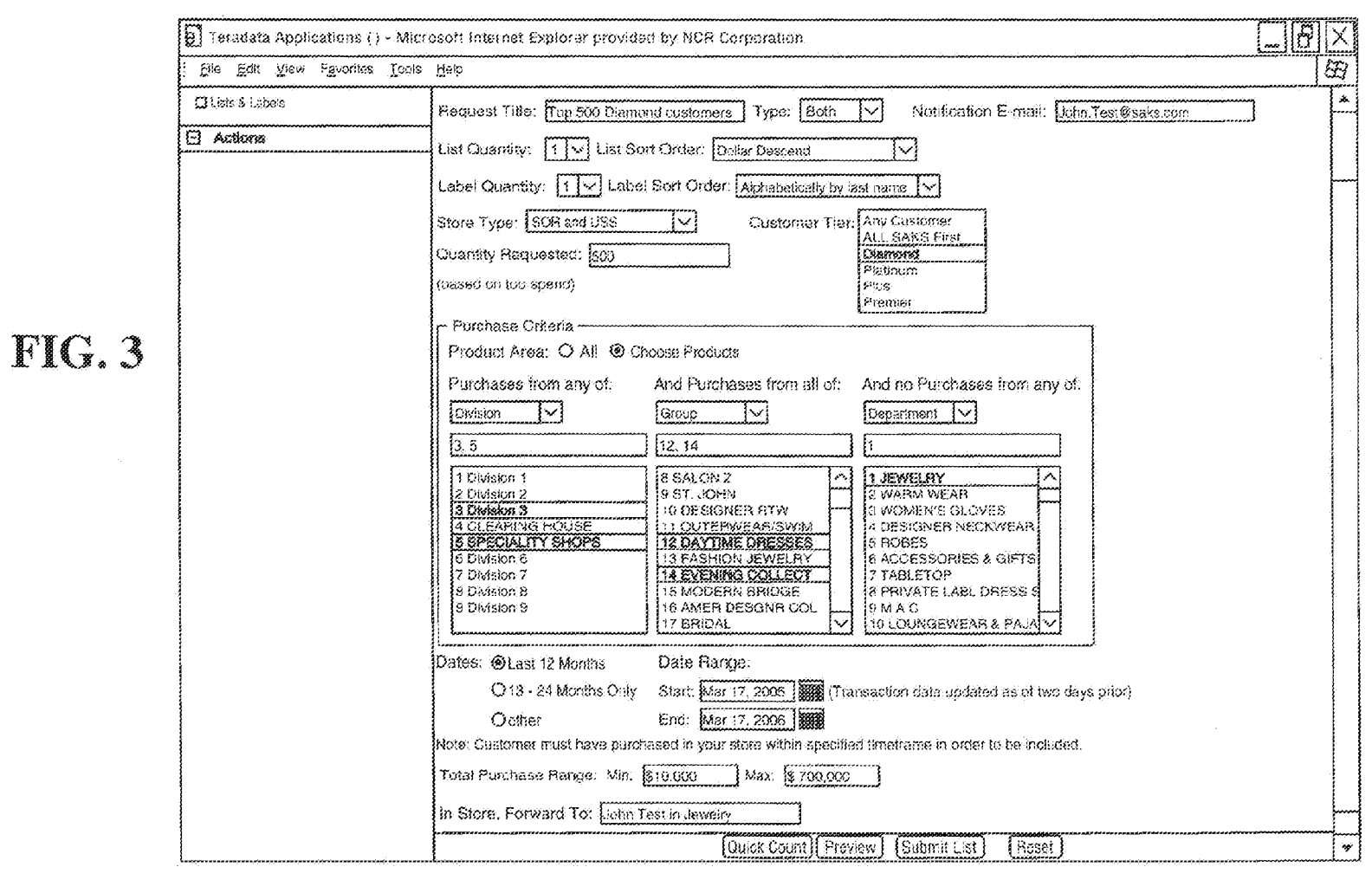

Teradata Applications ( ) - Microsoft Internet Explorer provided by NCR Corporation File Edit View Favorites Tools Help Lists & Labels Actions Request Title: Top 500 Diamond customers Type: Both Notification E-mail: John.Test@saks.com List Quantity: 1 List Sort Order: Dollar Descend Label Quantity: 1 Label Sort Order: Alphabetically by last name Store Type: SOR and USS Customer Tier: Any Customer ALL SAKS First Diamond Platinum Plus Premier Quantity Requested: 500

(based on top spend)

Purchase Criteria

Product Area: All Choose Products

Purchases from any of: Division 3, 5
1 Division 1
2 Division 2
3 Division 3
4 CLEARING HOUSE
5 SPECIALITY SHOPS
6 Division 6
7 Division 7
8 Division 8
9 Division 9

And Purchases from all of: Group 12, 14
8 SALON 2
9 ST. JOHN
10 DESIGNER RTW
11 OUTERWEAR/SWIM
12 DAYTIME DRESSES
13 FASHION JEWELRY
14 EVENING COLLECT
15 MODERN BRIDGE
16 AMER DESGNR COL
17 BRIDAL And no Purchases from any of: Department 1
1 JEWELRY
2 WARM WEAR
3 WOMEN'S GLOVES
4 DESIGNER NECKWEAR
5 ROBES
6 ACCESSORIES & GIFTS
7 TABLETOP
8 PRIVATE LABL DRESS S
9 M A C
10 LOUNGEWEAR & PAJA Dates: Last 12 Months Date Range:
13 - 24 Months Only Start: Mar 17, 2005 (Transaction data updated as of two days prior)
other End: Mar 17, 2006

Note: Customer must have purchased in your store within specified timeframe in order to be included.

Total Purchase Range: Min. $10,000 Max: $ 700,000

In Store, Forward To: John Test in Jewelry

Quick Count Preview Submit List Reset

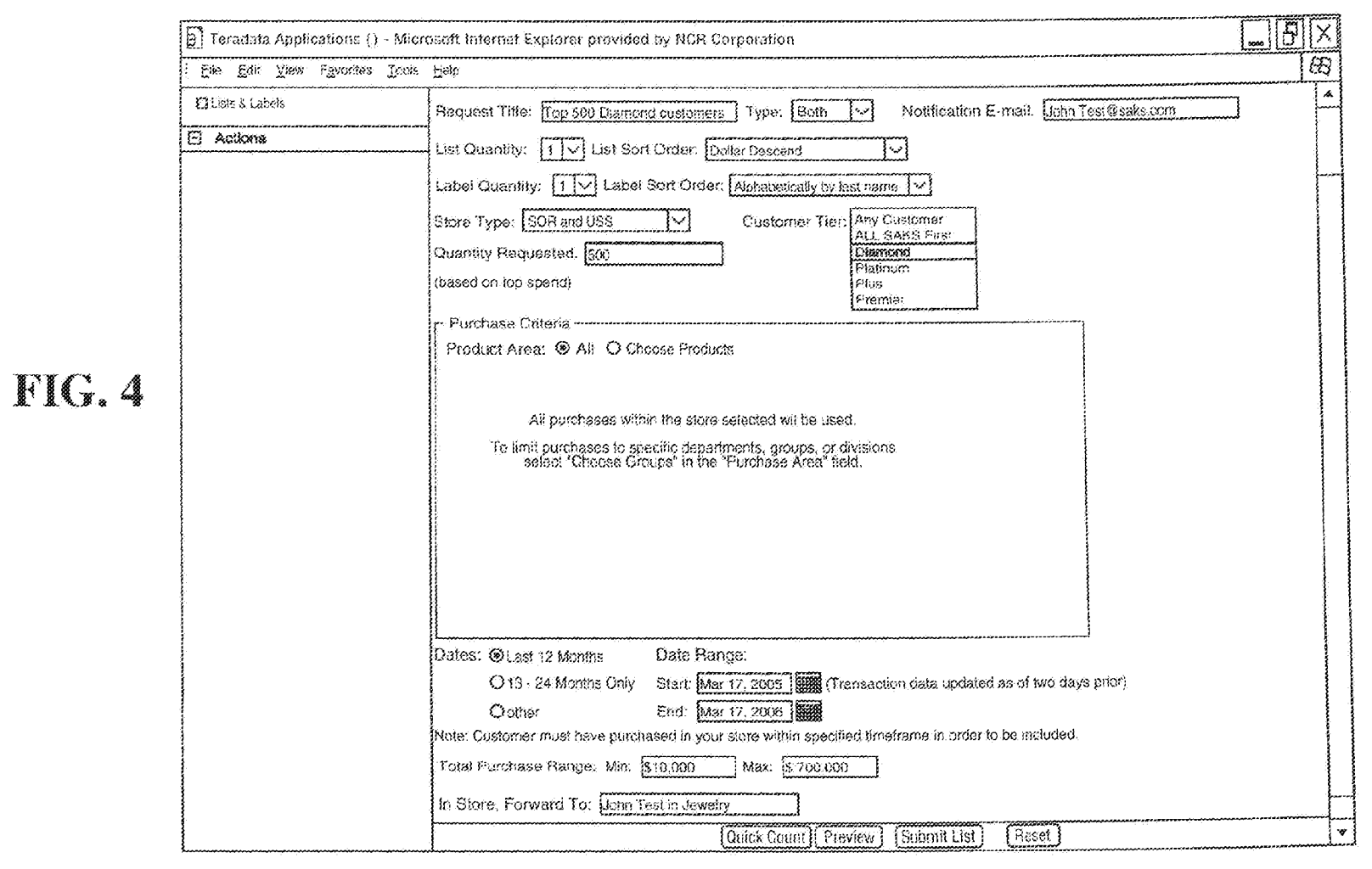

Teradata Applications () - Microsoft Internet Explorer provided by NCR Corporation File Edit View Favorites Tools Help Lists & Labels Actions Request Title: Top 500 Diamond customers Type: Both Notification E-mail: John.Test@saks.com List Quantity: 1 List Sort Order: Dollar Descend Label Quantity: 1 Label Sort Order: Alphabetically by last name Store Type: SOR and USS Customer Tier: Any Customer, ALL SAKS First, Diamond, Platinum, Plus, Premier Quantity Requested: 500

(based on top spend)

Purchase Criteria

Product Area: ◉ All ○ Choose Products

All purchases within the store selected will be used.

To limit purchases to specific departments, groups, or divisions select "Choose Groups" in the "Purchase Area" field.

Dates: ◉ Last 12 Months Date Range:

○ 13 - 24 Months Only Start: Mar 17, 2005 (Transaction data updated as of two days prior)

○ other End: Mar 17, 2006

Note: Customer must have purchased in your store within specified timeframe in order to be included.

Total Purchase Range: Min: $10,000 Max: $700,000

In Store, Forward To: John Test in Jewelry

Quick Count Preview Submit List Reset

FIG. 4

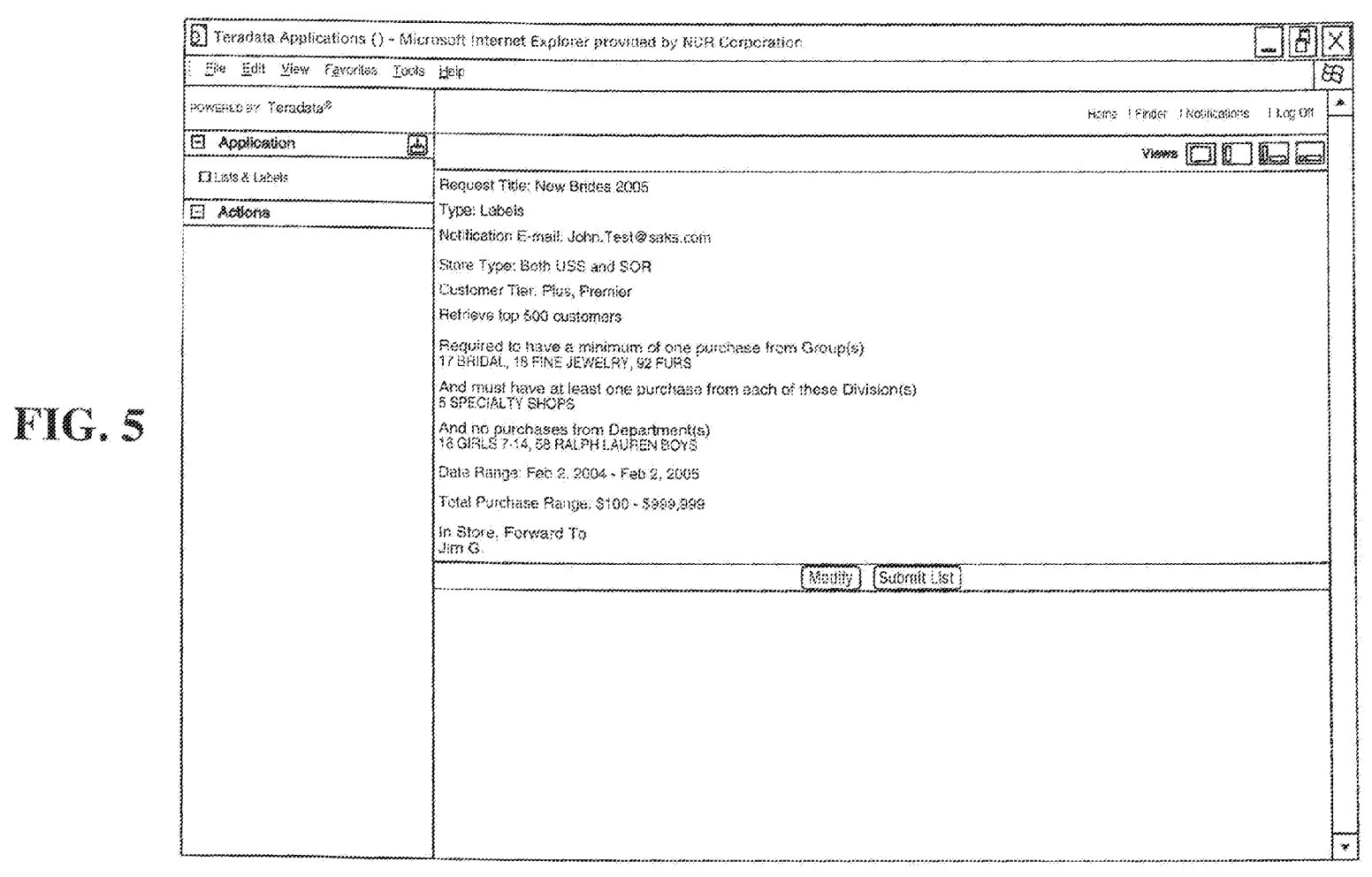

Teradata Applications () - Microsoft Internet Explorer provided by NCR Corporation File Edit View Favorites Tools Help POWERED BY Teradata®

Home | Finder | Notifications | Log Off

Application

Lists & Labels

Actions

Views

Request Title: New Brides 2005

Type: Labels

Notification E-mail: John.Test@saks.com

Store Type: Both USS and SOR

Customer Tier: Plus, Premier

Retrieve top 500 customers

Required to have a minimum of one purchase from Group(s)
17 BRIDAL, 18 FINE JEWELRY, 92 FURS And must have at least one purchase from each of these Division(s)
5 SPECIALTY SHOPS And no purchases from Department(s)
18 GIRLS 7-14, 58 RALPH LAUREN BOYS Date Range: Feb 2, 2004 - Feb 2, 2005

Total Purchase Range: $100 - $999,999

In Store, Forward To
Jim G.

Modify Submit List

FIG. 5

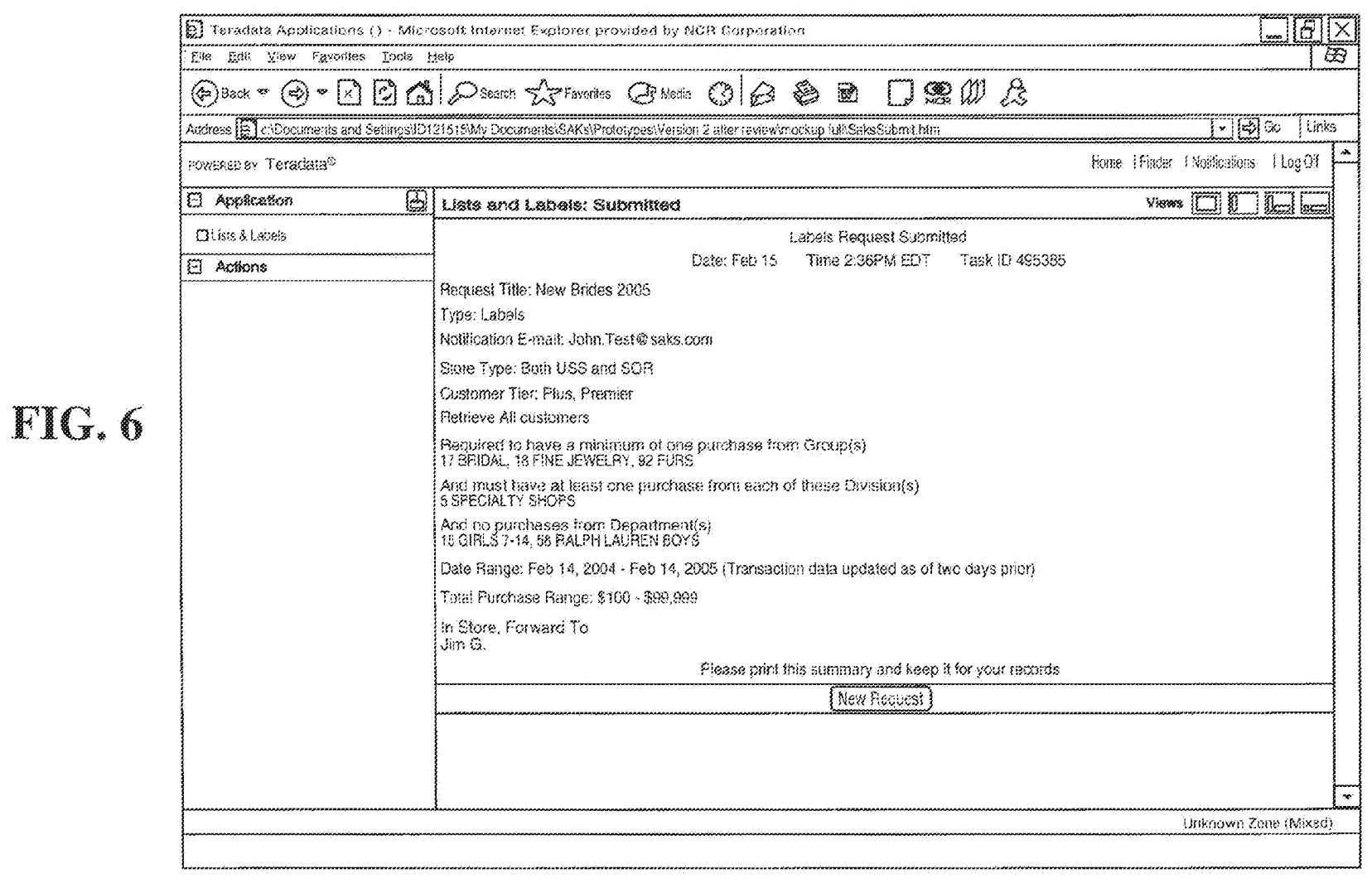

Teradata Applications () - Microsoft Internet Explorer provided by NCR Corporation File Edit View Favorites Tools Help Back Search Favorites Media Address c:\Documents and Settings\ID121515\My Documents\SAKs\Prototypes\Version 2 after review\mockup full\SaksSubmit.htm Go Links POWERED BY Teradata®

Home | Finder | Notifications | Log Off

Application

Lists & Labels

Actions

Lists and Labels: Submitted

Views

Labels Request Submitted

Date: Feb 15 Time 2:36PM EDT Task ID 495385

Request Title: New Brides 2005

Type: Labels

Notification E-mail: John.Test@saks.com

Store Type: Both USS and SOR

Customer Tier: Plus, Premier

Retrieve All customers

Required to have a minimum of one purchase from Group(s)
17 BRIDAL, 18 FINE JEWELRY, 92 FURS And must have at least one purchase from each of these Division(s)
5 SPECIALTY SHOPS And no purchases from Department(s)
18 GIRLS 7-14, 58 RALPH LAUREN BOYS Date Range: Feb 14, 2004 - Feb 14, 2005 (Transaction data updated as of two days prior)

Total Purchase Range: $100 - $99,999

In Store, Forward To
Jim G.

Please print this summary and keep it for your records

New Request

Unknown Zone (Mixed)

FIG. 6

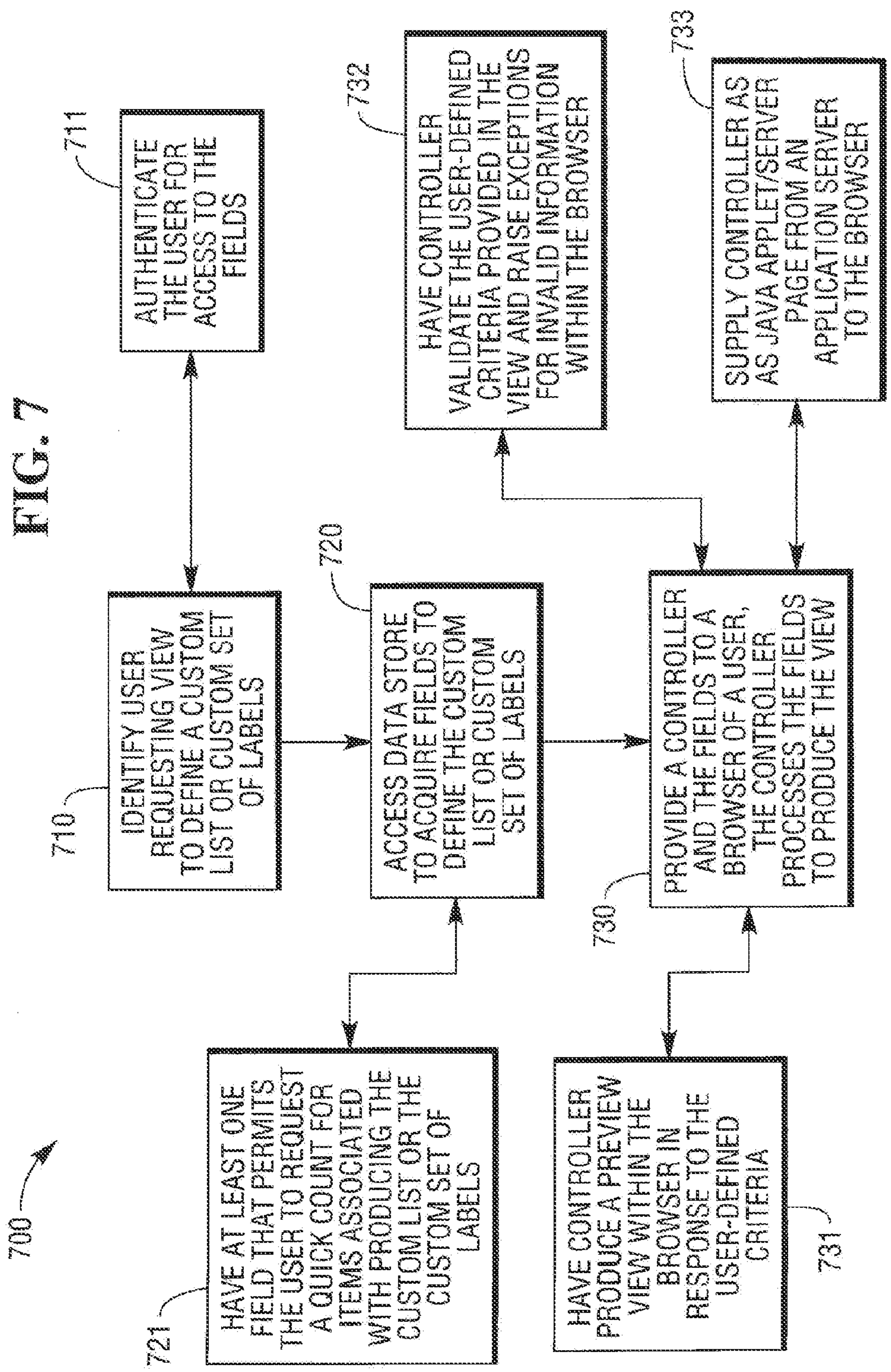
FIG. 7
700
710
IDENTIFY USER REQUESTING VIEW TO DEFINE A CUSTOM LIST OR CUSTOM SET OF LABELS
711
AUTHENTICATE THE USER FOR ACCESS TO THE FIELDS
720
ACCESS DATA STORE TO ACQUIRE FIELDS TO DEFINE THE CUSTOM LIST OR CUSTOM SET OF LABELS
721
HAVE AT LEAST ONE FIELD THAT PERMITS THE USER TO REQUEST A QUICK COUNT FOR ITEMS ASSOCIATED WITH PRODUCING THE CUSTOM LIST OR THE CUSTOM SET OF LABELS
730
PROVIDE A CONTROLLER AND THE FIELDS TO A BROWSER OF A USER, THE CONTROLLER PROCESSES THE FIELDS TO PRODUCE THE VIEW
731
HAVE CONTROLLER PRODUCE A PREVIEW VIEW WITHIN THE BROWSER IN RESPONSE TO THE USER-DEFINED CRITERIA
732
HAVE CONTROLLER VALIDATE THE USER-DEFINED CRITERIA PROVIDED IN THE VIEW AND RAISE EXCEPTIONS FOR INVALID INFORMATION WITHIN THE BROWSER
733
SUPPLY CONTROLLER AS AS JAVA APPLET/SERVER PAGE FROM AN APPLICATION SERVER TO THE BROWSER

GRAPHICAL USER INTERFACES FOR CUSTOM LISTS AND LABELS

RELATED APPLICATIONS

The present invention is a non provisional application claiming priority to U.S. Provisional Application No. 60/792,422 filed on Apr. 17, 2006; the disclosure of which is incorporated by reference herein. Additionally, the present invention is a continuation-in part of and claims priority to U.S. Ser. No. 11/646,655 filed on Dec. 28, 2006; the disclosure of which is also incorporated by reference herein.

COPYRIGHT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the example source code as described below and in any drawings hereto: Copyright © 2007, NCR Corp. of Dayton, Ohio—All Rights Reserved.

FIELD

The invention relates generally to graphical user interfaces and more particularly to techniques for generating and using graphical user interfaces to generate custom lists and labels.

BACKGROUND

Enterprises are increasingly capturing, storing, and mining a plethora of information related to communications with their customers. Often this information is stored and indexed within databases. Once the information is indexed, queries are developed on an as-needed basis to mine the information from the database for a variety of organizational goals, such as to produce customer lists or labels.

Frequently, existing database tools and services provide mechanisms for users to acquire customer lists and labels. Producing lists or labels is not the main focus of these tools and services. Consequently, the solutions available are often excessively broad in scope or too narrow to be useful for a given desired application. Moreover, these tools and services often require trained personnel or a fairly substantial amount of training for users to produce any meaningful customer list or set of labels.

In other cases, when an analyst wants to generate a specific list or set of labels from a database, the analyst submits a set of criteria to query specialists. The query specialists than produces the necessary SQL to execute a query against the database and the analyst may subsequently process the query as needed.

There are several inefficiencies associated with this approach. First, the analyst is the individual most knowledgeable as to what the analyst wants and if the analyst misses something or does not appreciate the techniques used by the query specialists, then there may be several iterations with the query specialists before the desired list or set of labels can be produced.

Second, the query specialists often serve many analyst within an enterprise and the query specialists probably has many other responsibilities within an enterprise. As a result, the analyst may not receive his/her query in a timely fashion. Thus, the analyst may be idle for a period of time waiting on the query to proceed or the analyst may miss a business opportunity when the query is time sensitive. The request from the analyst also adds to the workload of an already likely loaded search specialist.

Additionally, the analyst may have a specific amount or number of individuals that the analyst wants to have in the list or set of labels. That is, the analyst may only be able to handle a predefined number of individuals or may only want a certain number of customers. If the query returns more than this desired amount, then the analyst may have to submit a revised request to the search specialists. Conversely, the analyst may receive too few individuals in the search query results and may want to alter the search query, which is developed by the query specialist, to increase the individuals in the list or set of labels. Thus, the process of obtaining the desired size for a list or set of labels can result in unnecessary iterations between the analyst and the search specialist, which can further delay the needs of the analyst and the enterprise.

Thus, it can be seen that improved mechanisms, tools, and/or interfaces for producing lists and labels are desirable.

SUMMARY

In various embodiments, techniques for generating and using graphical user interfaces (GUI's) to produce and manage custom lists and labels are presented. According to an embodiment, a machine-implemented system is provided. The machine-implemented system includes a database and an application server. The database includes definitions to activate GUI views when acquired and processed by the application server. The views include fields that accept user-defined criteria for defining custom lists or custom sets of labels from customer data that also resides in the database.

BRIEF DESCRIPTION OF THE DRAWINGS

FIG. 3 is a general selection criteria input screen for a GUI, according to an example embodiment.

FIG. 4 is a product-independent selection criteria input screen for a GUI, according to an example embodiment.

FIG. 5 is a preview of the user-defined criteria screen for a GUI, according to an example embodiment.

FIG. 6 is a submission summary of the user-defined criteria submitted for processing into a custom list or custom set of labels, according to an example embodiment.

FIG. 7 is a diagram of a method for providing and processing a custom GUI that defines and produces custom lists and sets of labels, according to an example embodiment.

DETAILED DESCRIPTION

Figure 1:
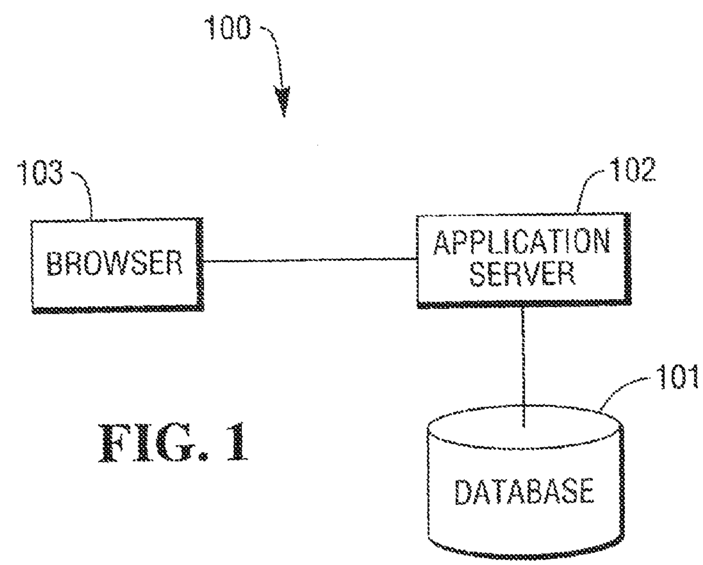
FIG. 1 is a diagram of a custom list and label system, according to an example embodiment.

FIG. 1 is a diagram of a custom list and label system 100, according to an example embodiment. The custom list and label system 100 is implemented in machine-accessible or computer-readable media and is executed by one or more machines (processing devices). Moreover, the custom list and label system 100 is accessible over a network. The network may be wired, wireless, or a combination of wired and wireless.

A "list" as used herein may include any selective group of information acquired from a data store. For example, a list may be a set of customer identifiers associated with some predefined criteria. The criteria when embodied as a search query can be executed against the data store to return the list. It is understood that the list may include other types of information beyond just customer identifiers or numbers, such as product identifiers, store identifiers, etc.

A "set of labels" as used herein may include information that includes names and addresses. Each name and address pair is a label within the set of labels. The set of labels may be viewed as one type of list. Moreover, the list may include more information than is necessary to produce a set of labels, such as phone numbers, transaction history, customer identifiers, etc.

It is within this context that the custom list and label system 100 is now described in detail with reference to the FIG. 1.

The custom list and label system 100 includes a database 101 and an application server 102. In an embodiment, the custom list and label system 100 may also include a browser 103. Each of these and their interactions with one another will now be discussed in turn.

The database 101 is accessible on a machine and over a network. According to an embodiment, the data store is an enhanced version of the Teradata® warehouse product or service distributed by NCR Corporation of Dayton, Ohio.

The database 101 includes, among other things, customer data, fields, procedures, list and label tables, etc. The customer data is the data managed by an enterprise for its customers. It may include a variety of types of information, such as names, transaction history, loyalty level, relationships to other groups or customers, address, phone, email, and the like.

The fields are used with the list and label tables to define views. The fields may be combined in various predefined or custom ways to produce a view within a GUI. Each view is dynamically assembled based on definitions associated with the fields and information included in the lists and label tables.

The fields can be used to identify and subsequently capture a variety of user defined information within any given dynamically produced view for the GUI. Some example fields are as follows:

1) A job type, which can be used with lists, labels, or both lists and labels. A job type identifies whether the user wants to produce a list (report of some sort) of customers or products selected by a user-defined set of criteria; address labels; or both a list and address labels.
2) A list or label quantity, which defines a total number of items that the user wants to appear in the list, set or labels, or both the list and the set of labels.
3) A label or list sort order, which defines a sort order for the list or labels, such as dollar amount (descending, ascending, etc.), alphabetically, etc.
4) A store type code, which identifies whether a customer's store selection is the customer's usual store shopped (USS); store of residence (SOR); USS or SOR; or USS and SOR.
5) A product definition, which provides a user the ability to select between retail levels. For example, three retail levels may be Division, Group, and Department. The Boolean operators AND, OR, and NOT may also be used with the product definition. So, a user can ask for customers who have purchased from (Division 1 AND Division 2) AND (Department 360R Department 38) BUT NOT IN Group 63. Thus, the Boolean expression may be nested. This allows users to request highly detailed lists of specific customers. Users may select the Division, Department, and/or Group or other custom-defined levels via a coded value, via selection from a list, or via manual text entry.
6) A customer level, which identifies a designation used by an enterprise for a customer category, such as loyalty, preferred, etc. The customer level may also be hierarchical. A retail entity may setup multiple customer levels (e.g., based on loyalty, etc.) and a user can choose to select customers from one or multiple levels, or even all customers.
7) A minimum amount, which is purchased in dollars by a customer for the selected criteria.
8) A maximum amount, which is purchased in dollars by the customer for the selected criteria.
9) A requested start date, which is the beginning date for which to sum up purchases that fit the criteria.
10) A requested end date, which is the end date for which to sum purchases that fit the criteria. Dates can be selected via a graphical calendar presented to them or even perform the selection on some pre-defined time frames.
11) A quantity requested, which is a maximum number of items that a user wants to appear in the custom list or custom set of labels. The resulting list or set of labels can be ordered; such as by total of purchases (descending) and cut off at the requested maximum quantity. Thus, a maximum count of 250 can be used to cut off the list or set of labels to the top 250; or even bottom 250.
12) A quick count, which can be selected by the user to provide a quick estimate as to the total number of items that, may appear in the custom list or custom set of labels. Here, the query is executed to get a total count but rather that retrieves and builds the list or set of labels just the count for the total items is returned. This permits the user to modify the user-defined criteria being used to produce the list or set of labels to get a more manageable and desirable amount of items. The quick count can be processed iteratively until the user achieves an optimal or desired count in the list or set of labels.

The database 101 can also include one or more procedures accessible to the application server 102. The procedures may be used by the application server 102 to handle query processing against the database 101 and used for submission purposes to acquire the GUI views and processing the user-defined criteria.

According to an embodiment, at least one procedure is activated via or in response to the user-defined criteria and processed by an application service of the application server 102 to supply a quick count for the custom list or custom set of labels. The quick count (as discussed above with the fields) represents a total number of items that appears in the custom list or custom set of labels.

The application server 102 is accessible on a network machine and interacts with the database 101. According to an embodiment, the application server 102 is a world-wide web (WWW) based application that executes, distributes, and uses Java Sever pages and Struts.

The application server 102 includes a variety of applications or application services that process on behalf of a remote client or user over a network, such as the Internet. The application server 102 interacts with the database 101 to acquire the fields, procedures, and to dynamically assemble and present the views to the user. The application server 102, in response to values selected or supplied in the fields of the views by a user, also uses the customer data of the database 101 to produce the custom list or custom set of labels or to produce a quick count.

In an embodiment, the application server 102 delivers data to JAVA applets, or delivers complete JAVA Server Pages to a browser 103 of a user's client machine over the Internet and the WWW. The applets process in the browser 103 and interact with the database 101; the server pages process on the application server 102 and delivers pages to the browser 103. The application server 102 produces the GUI views (screens) as WWW pages within the browser 103 and receives the user-defined criteria and provides the custom list or custom set of labels and/or quick counts.

Figure 2:
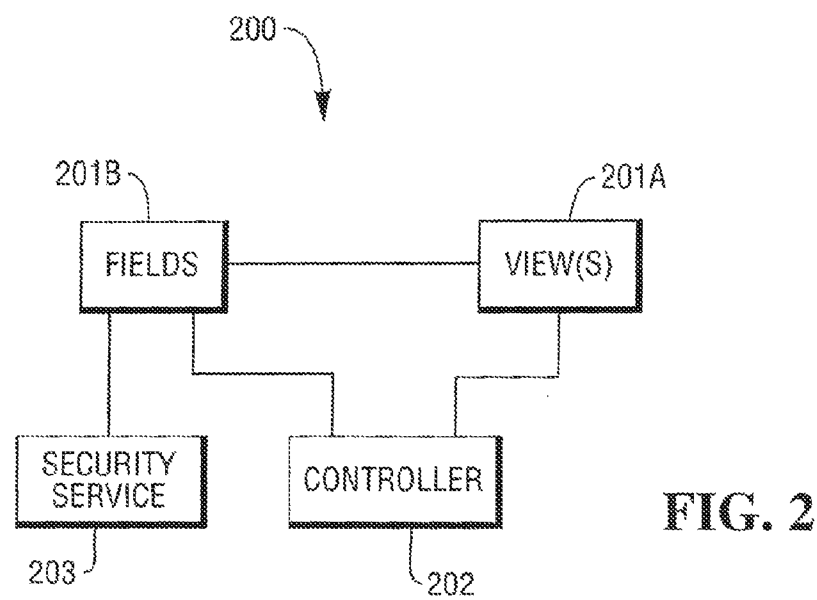
FIG. 2 is a diagram of a GUI to produce screens for defining and generating custom lists and sets of labels, according to an example embodiment.

FIG. 2 is a diagram of a GUI 200 to produce screens for defining and generating custom lists and sets of labels, according to an example embodiment. The GUI 200 is implemented in a machine-accessible and readable medium that when executed by a machine produces a variety of views, such as the example views presented in FIGS. 3-6 and discussed below.

The GUI 200 includes one or more views 201A having fields 201B and a controller 202. The GUI may also include a security service 203. Each of these and their interactions with one another will now be discussed in turn.

Each view 201A is dynamically defined by combinations of fields and at least one view 201A includes a combination to permit user-defined criteria to be received in the fields 201B for defining custom lists or custom sets of labels. Example fields 201B were presented above with reference to the system 100 and the database 101 of the FIG. 1. The fields 201B when assembled in combinations produce views 201A. At least one view 201A permits a user to select or supply specific values to one or more of the fields 201B in that view 201A. The user-defined criteria defines the user desired list or set of labels.

According to an embodiment, at least one view 201B provides a preview of the user-defined criteria and a submission option to activate the controller 202 in order to produce a particular custom list or a particular custom set of labels. An example of this is presented below with reference to the FIG. 5.

In another embodiment, at least one view 201B provides a screen within the GUI that permits general selection criteria to be presented to the user for supplying the user-defined criteria. An example of this is presented below with reference to the FIG. 3.

In still another embodiment, at least one view 201B provides a screen that permits independent selection criteria to be presented to the user for supplying the user-defined criteria. An example of this is presented below with reference to the FIG. 4.

The controller 202 is to dynamically process one or more of the views 201A using the combinations of the fields 201B within a browser of a user. The controller 202 is to also process the user-defined criteria supplied by the user in order to provide the custom lists or custom set of labels.

In an embodiment, the controller 202 is to also validate the used-defined input criteria before processing the user-defined criteria. The controller 202 may also raise exceptions when portions of the user-defined criteria are invalid. The exceptions may be presented within one or more of the views 201A, some of which may also include the user-defined criteria. For example, suppose that a maximum amount field 201B is to include only digits representing a dollar amount and a user supplies a text string. In such a situation, the controller 202 may raise an immediate exception within the view 201A being presented as a screen within the GUI 200 to the user and indicate that the field 201A expects a numeric value and not string value.

According to another embodiment, the controller 202 is to process a quick count to predetermine a total number of items for a particular custom list or a particular custom set of labels produced when the user-defined input criteria is processed.

In one situation, at least a portion of the user-defined input criteria is to direct the controller to supply a particular list or a particular set of labels produced by user-defined input criteria to an automated service for subsequent processing. The automated service may be another database application, such as reporting, querying, etc. In another case, the automated service may be a printer service that prints or sends print jobs to a printer service, where the print job is a custom set of labels.

In an embodiment, the GUI 200 may also include a security service 203. The security service 203 may authenticate the user to the one or more views 201A or even particular combinations of the fields 201B or particular fields 201B. In other words, a user may only have access to view and interact with certain views 201A or certain fields 201B or certain combination of fields 201B. The security service 203 may use any type of authentication mechanism, such as identifier and password combinations, digital signatures, biometrics, digital certificates, etc.

In one case, the browser that interacts with the controller 202 is a WWW browser that acquires the controller from an application server, such as application server 102 of the system 100, over an Internet connection. The controller 202 may be implemented or delivered to the browser as a self-loading and executing JAVA applet or may use JAVA Server Pages that communicate with the user's browser.

The GUI 200 is defined by a series of views 201A that are instantiated by the controller 202 using the fields 201B and perhaps the identity of the user and/or policy and procedures. These dynamically generated views 201A are provided within a browser of the user. The user supplies selection values as user-defined input criteria. This in turn forces the controller 202 to take action that may validate the selections and/or process the selections. Some processing may produce a custom list or a custom set of labels. Other processing may automatically provide the list or set of labels to other automated downstream services. In still other cases, processing may produce a new view 201A where the user can preview user-defined input criteria and or see a quick count (as defined and discussed at length above).

FIGS. 3-6 now provide some example screen shots for some views 201A for purposes of comprehension and illustration. It is to be understood these screen shots are presented for purposes of illustration only and that other combinations of fields 201B defined herein or other fields not specifically mentioned may be used in different custom screen shots.

FIG. 3 is a general selection criteria input screen for a GUI, according to an example embodiment. This screen shot shows a variety of fields arranged in a particular combination to permit a user to generally defined user-input criteria by providing selections from lists and by providing desired values. The selections and values when processed produce a specific custom list or specific custom set of labels. In this screen shot, the user can select products and define them based on Division, Group, and Department. There is also action buttons to permit quick count or preview features (discussed above in detail).

FIG. 4 is a product-independent selection criteria input screen for a GUI, according to an example embodiment. This screen shows how users can identify a list or custom set of labels without regard to the actual products that may have been purchased. As contrasted with FIG. 3, FIG. 4 dynamically removes the product definition in response to a user selection for all products. Again, quick count and preview features are available in this screen shot.

FIG. 5 is a preview of the user-defined criteria screen for a GUI, according to an example embodiment. This screen contains a preview that shows selections and values made by a user in screens presented in FIGS. 3-4. Action items permit the user to modify the selections or values or to submit the user-defined input criteria for processing to produce a custom list or a custom set of labels.

FIG. 6 is a submission summary of the user-defined criteria submitted for processing into a custom list or custom set of labels, according to an example embodiment. The screen presented in FIG. 6 is similar to the preview screen shown in FIG. 5. However, in the screen depicted in FIG. 6, a user has already submitted the user-defined criteria for submission and processing into a custom list or custom set of labels. This is a submission summary that shows the user what was submitted along with some additional information that is useful to the user to track what was submitted, such as a task identifier (labeled as "TASK ID: 495385") and a date and time the submission was made.

FIG. 7 is a diagram of a method 700 for providing and processing a custom GUI that defines and produces custom lists and sets of labels, according to an example embodiment. The method 700 (hereinafter referred to as "GUI service") is implemented in a machine-accessible and readable medium as instructions and is accessible over a network. The network may be wired, wireless, or a combination of wired and wireless. In an embodiment, portions of the GUI service are implemented in the system 100 of the FIG. 1 and the GUI 200 of the FIG. 2.

At 710, the GUI service identifies a user requesting a view to define a custom list or custom set of labels. The user may be requesting the view via a uniform resource locator (URL) via a WWW browser over the Internet. The point of the view is to permit the user to supply values and selections (user-defined input criteria) for defining a custom list or a custom set of labels.

In some cases, at 711, the GUI service may also independently authenticate the user or use a third-party service or application to assist in authenticating the user. The user may be authenticated to have access to just certain fields of the requested view.

At 720, the GUI service accesses a data store to acquire fields that define the custom list or custom set of labels desired by the user. That is, the fields define the view and subsequent supplied user selections and values for the fields define the custom list or the custom set of labels desired by the user.

According to an embodiment, at 721, the GUI service may ensure at least one field within the view that permits the user to request a quick count for items associated with producing the custom list or custom set of labels. The features of a quick count were described above in detail with reference to the FIGS. 1-5.

At 730, the GUI service provides a controller and the fields to a browser of the user. The controller processes the fields to produce the view being presented to user. At 731, the GUI service has the controller produce a preview view within the browser in response to the user-defined criteria. An example preview screen was described above and presented by way of illustration in FIG. 5.

According to an embodiment, at 732, the GUI service has the controller validate the user-defined criteria provided in the view and raise exceptions for invalid information within the browser. In other words, the controller may be sensitive to values and combinations of selections within the fields of the view and may raise exceptions when the values or combinations are incompatible or invalid.

In an embodiment, at 733, the GUI service supplies the controller as a JAVA applet or as JAVA Server Pages from an application server to the browser client of the user. The controller is self-loading and self-executing within the browser client and dynamically generates the view requested by the user within the browser using the fields supplied by the GUI service and acts as a driver for packaging and interfacing with the GUI service and a database that is queried to produce the custom list or custom set of labels.

One now appreciates how a WWW-based service in a client server architecture may be used to permit a user to custom define lists and labels. The user does not have to know a particular application or database query language and the user can interactively use the GUI tools presented herein to optimally hone the desired list and labels.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented system, comprising:

a processing device;

a database to execute on the processing device; and an application server to execute on the processing device, the database includes definitions to dynamically activate graphical user interface (GUI) views when acquired and processed by the application server, and the views include fields that accept user-defined criteria for defining custom sets of labels from customer data that also resides in the database, each label an address label for a particular customer and includes a pair of information having a customer name and a customer address and each view is dynamically customized and assembled based on field definitions associated with the fields and information included in the labels and each view includes a quick count button and preview feature, the quick count button showing a total number of labels within that view, and the application server includes a procedure that is activated by user-defined criteria to produce the labels and the quick count.

2. The system of claim 1 further comprising, a browser to process on a client machine, wherein a user is to interact with the application service over a network connection via the browser to access the GUI views and to supply the user-defined criteria.

3. The system of claim 1, wherein the database further includes one or more procedures accessible to the application service to handle query processing and submission for purposes of acquiring the GUI views and processing the user-defined criteria.

4. The system of claim 3, wherein at least one procedure is activated via the user-defined criteria and supplies a quick count for a total number of items included in the custom sets of labels.

5. The system of claim 1, wherein the fields include a customer level that identifies a hierarchical loyalty category for an enterprise count.

6. The system of claim 1, wherein the GUI views include one or more screens accessible to a user via a world-wide web (WWW) browser connected to the application server, and wherein a particular view includes one of the following: a general selection criteria input screen, a product-independent selection criteria input screen, and a preview of the user-defined criteria screen.

7. The system of claim 1, wherein the application server is a world-wide web (WWW) based application that delivers WWW pages to a client machine of a user over the Internet.

8. A Graphical User Interface (GUI) implemented on a machine, comprising:

a processor coupled to a memory;

one or more views, wherein each view is to be dynamically defined and customized by using combinations of fields and custom sets of labels and at least one view includes a combination to permit user-defined criteria to be received in the fields for defining the custom sets of labels, each label an address label for a particular customer and includes a pair of information having a customer name and a customer address; and a controller to dynamically produce the one or more views using the combinations within a browser of a user and to process the user-defined criteria to provide the custom sets of labels, each view includes a quick count button and preview feature, the quick count button showing a total number of labels within that view and the controller is configured to supply a particular list produced for the user-defined criteria to an automated service for subsequent processing.

9. The GUI of claim 8, wherein at least one view provides a preview of the user-defined criteria and a submission option to activate the controller to produce a particular custom set of labels.

10. The GUI of claim 8, wherein the controller is to validate the user-defined input criteria before processing and raise exceptions when invalid within the at least one view having the user-defined input criteria.

11. The GUI of claim 8, wherein the controller is to process a quick count to predetermine a total number of items for a particular custom set of labels produced when the user-defined input criteria is processed.

12. The GUI of claim 8, wherein at least a portion of the user-defined input criteria is to direct the controller to supply a particular set of labels produced by user-defined input criteria to an automated service for subsequent processing.

13. The GUI of claim 8 further comprising, a security service to authenticate the user to the one or more views, wherein the security service interacts with the controller.

14. The GUI of claim 8, wherein the browser is a world-wide web (WWW) browser that acquires the controller from an application server over an Internet connection.

15. A method comprising:

identifying a user requesting a view to permit the user to define a custom set of labels, each label and address label for a particular customer and includes a pair of information having a customer name and a customer address;

accessing a data store to dynamically acquire fields to define the custom set of labels; and providing a controller and the fields to a browser of the user, the controller processes the fields to dynamically produce the view within the browser on behalf of the user as a customized view based on the custom set of labels and the fields, and the customized view includes a quick count button and preview feature, the quick count button showing a total number of labels within the customized view, and wherein the controller produces a list for the custom set of labels and provides to an automated service for subsequent processing.

16. The method of claim 15, wherein identifying further includes authenticating the user for access to the fields.

17. The method of claim 15, wherein accessing further includes having at least one field that permits the user to request a quick count for items associated with producing the custom set of labels.

18. The method of claim 15, wherein providing further includes having the controller produce a preview view within the browser in response to user-defined criteria provided in the view.

19. The method of claim 15, wherein providing further includes having the controller validate user-defined criteria provided in the view and raise exceptions for invalid information within the browser.

20. The method of claim 15, wherein providing further includes supplying the controller as an applet for an application server to the browser, and which is delivered to the browser.

* * * * *